(12) United States Patent
Soohoo

(10) Patent No.: US 6,292,164 B2
(45) Date of Patent: *Sep. 18, 2001

(54) SYSTEM AND METHOD FOR CHARACTER DISPLAY AND ENTRY IN CHARACTER PROCESSING SYSTEM

(75) Inventor: Kenneth Soohoo, Redwood Shores, CA (US)

(73) Assignee: Planetweb, Inc., Redwood, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,774

(22) Filed: Nov. 13, 1998

(51) Int. Cl.[7] ........................................ G09G 5/26
(52) U.S. Cl. .................... 345/128; 345/141; 345/471; 345/25; 725/14
(58) Field of Search .......................... 345/25–26, 128, 345/130, 141, 127, 129, 471, 467, 468, 469, 472; 382/298, 299; 455/2; 725/37, 14

(56) References Cited

U.S. PATENT DOCUMENTS

| | | | |
|---|---|---|---|
| 4,409,591 | * 10/1983 | Simkovitz | 345/26 |
| 5,016,000 | * 5/1991 | Bugg | 345/130 |
| 5,539,868 | * 7/1996 | Hosoya et al. | 345/471 |
| 5,819,156 | * 10/1998 | Belmont | 455/2 |

* cited by examiner

Primary Examiner—Richard Hjerpe
Assistant Examiner—Frances Nguyen
(74) Attorney, Agent, or Firm—Wilson Sonsini Goodrich & Rosati

(57) ABSTRACT

Displaying a set of characters in a size larger than characters already accepted and displayed in the system. A method for accepting input in a system. The method includes receiving a set of user inputs associated with a set of characters. The set of characters is displayed in size larger than characters already accepted and displayed in the system. A user selection of at least a character from the set of characters is received. In response to the user selection, the character is displayed in a size generally corresponding to characters already accepted and displayed by the system. According to one embodiment of the invention, the set of characters comprises kanji. An embodiment of the invention includes a computer system including a display, a user input device, a memory including a data structure that associates sets of user inputs with respective sets of characters, and a computer executable code. An embodiment of the invention is a system including a television monitor, a computer system coupled to a network and to the television monitor, a user input device, and logic.

51 Claims, 8 Drawing Sheets

SYSTEM AND METHOD FOR CHARACTER DISPLAY AND ENTRY IN CHARACTER PROCESSING SYSTEM

BACKGROUND OF THE INVENTION

Japanese and other Asian languages are composed of thousands of characters, but only about a hundred keys exist on a typical keyboard. In a computer system adapted for such a language, a word may be input through a combination of phonetic inputs. The user types the sound of the word into the keyboard, the user's inputs are displayed on the screen, and the user requests a front end processor to Ad supply different word choices that sound the same but have different meanings. A system typically displays any one of these thousands of characters on a display screen in a graphical space that typically has a pixel resolution of 16×16 or fewer pixels per character. In such a small space, one character is very hard to distinguish from another.

Field of the Invention

The invention relates to text processing; in particular the invention relates to user input of information for a text processing system in a language having a large number of characters.

SUMMARY OF THE INVENTION

The invention involves displaying a set of characters in a size larger than characters already accepted and displayed in the system. An advantage of such a system is ease of selection among these characters in the set of characters because they are easier to read. Such a system is of a particular advantage in a text processing system that receives a set of user inputs associated with a set of possible characters.

An embodiment of the invention is a method for accepting input in a system. The method includes receiving a set of user inputs associated with a set of characters. Characters from the set of characters are displayed in size larger than characters already accepted and displayed in the system. A user selection of at least a character from the set of characters is received. In response to the user selection, the character is displayed in a size generally corresponding to characters already accepted and displayed by the system.

According to various aspects of the invention, the size larger than characters already accepted and displayed comprises a size generally twice as tall as characters already accepted and displayed by the system, at least one and half as tall as characters already accepted and displayed by the system, or at least twice as large as characters already accepted and displayed by the system. According to other embodiments of the invention, the size larger than characters already accepted and displayed comprises a size appropriate to aid legibility of the character. According to another aspect of the invention, the size larger than characters already accepted and displayed comprises a point value twice as great as the font characters already accepted and displayed. For example, in one embodiment, characters already accepted and displayed are shown in 12 point, and the size larger than characters already accepted and displayed comprises 24 point.

According to one embodiment of the invention, the set of characters comprises kanji. According to another aspect of the invention, the set of inputs comprises a set of hiragana, and the set of characters comprises kanji associated with the hiragana.

According to one embodiment of the invention, more than one character from the set of characters is displayed in response to the user selection.

According to another embodiment of the invention, the set of characters includes a first subset of the set of characters corresponding to the set of user inputs and a second subset of the set of characters corresponding to the set of user inputs. According to another embodiment of the invention, the first subset is displayed in an area having a different background than the second subset. According to another embodiment, the first subset and the second subset are displayed without borders between them.

An embodiment of the invention includes a computer system including a display, a user input device, a memory including a data structure that associates sets of user inputs with respective sets of characters, and computer executable code. The computer executable code receives a set of user inputs, the set of user inputs being received from the user input device. Based on the data structure, the computer executable code determines a set of characters associated with the set of user inputs. The computer executable code causes at least some characters from the set of characters to be displayed on the display. The at least some characters being displayed are displayed in a size taller than the characters already accepted and displayed on the display, thereby providing ease of selection among the at least some characters displayed. In response to a user selection among the at least some characters, the computer executable code causes at least a selected character to be displayed on the display.

An embodiment of the invention is a system including a television monitor, a computer system coupled to a network and to the television monitor, a user input device, and logic. The logic receives a set of user inputs. The set of user inputs is received from the user input device. The logic determines a set of characters associated with the set of user inputs, and causes at least some characters from the set of characters to be displayed on the television monitor. The at least some characters are displayed in a size larger than characters already accepted and displayed on the television monitor, thereby providing ease of selection among the at least some characters displayed. In response to a user selection among the characters from the set displayed, the logic causes at least a selected character to be displayed on the television monitor.

According to an embodiment of the invention, the set of characters comprises characters of an Asian language. According to one example, the set of characters includes Japanese characters. According to another example, the set of characters includes Chinese characters.

DETAILED DESCRIPTION

The following is a description of embodiments of the invention. The embodiments shown help to illustrate the invention. However, it is not intended that the invention be limited to the precise embodiments shown.

FIG. 1A–FIG. 1D show a sequence of display on a system according to one embodiment of the invention. These figures show characters already accepted and displayed by the system, and the sequence of events for displaying new characters for selection and accepting and displaying such characters. The characters are represented in FIGS. 1A–1D as letters, e.g., X, Y, and Z, as opposed to the precise characters that could be displayed. For example, in an embodiment of the invention in a Japanese system, the X's could be replaced with entered kanji, hiragana, katakana, and romaji. The Y's could be replaced with hiragana, katakana, or romaji or a combination thereof. The Z's could be replaced with kanji, hiragana, katakana, and romaji. Alternative combinations of characters and symbols are possible for a Japanese system, in various other embodiments of the invention.

Figure 1A:
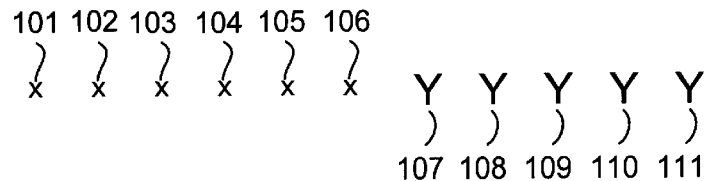
FIG. 1A shows a line of characters and new user input in a text processing system.
Figure 1B:
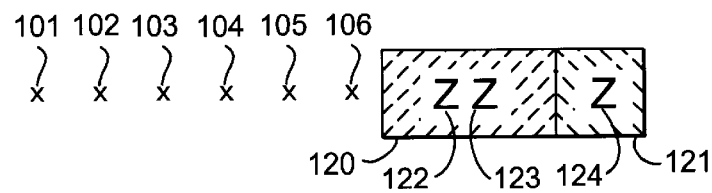
FIG. 1B shows a line of characters in a text processing system including subsets of characters displayed for selection.

FIG. 1A shows a line of characters and new user input in a text processing system. Characters X's 101–106 have been entered already by a user and are displayed in normal size. The Y's 107–111 represent user inputs corresponding to a phonetic spelling and are displayed in an enlarged size, according to the embodiment of the invention, a point size twice as great as that of the normal point size of characters 101–106. When a user of such a system desires to enter a new character, the user types a series of user inputs such as inputs 107–111. These user inputs may be displayed as the phonetic characters corresponding to the typed inputs. Alternatively, such display may not occur, and the system may directly display the possible characters for selection as shown in FIG. 1B. In one example system, inputs 107–111 are characters of the hiragana alphabet, which is a phonetic alphabet in the Japanese language. In another example system, inputs 107–111 are characters of a phonetic alphabet associated with another language. Once the user has completed typing inputs 107–111, the user requests a front end processor, to display the set of characters that correspond to the set of user inputs 107–111. Such characters typically are the characters that sound the same as the phonetic spelling typed by the user in typing inputs 107–111. Typically, a front end processor will group user inputs 107–111 into subgroups and determine a possible set of characters corresponding to each subgroup.

FIG. 1B shows a line of characters in a text processing system including subsets of characters displayed for selection. Thus, FIG. 1B results from the user selecting the front end processor to provide possible characters corresponding to user inputs 107–111. Here, two subsets of characters from the set of characters corresponding to user inputs 107–111 are shown. The first subset is displayed in window 120 and includes character 122 and character 123, both represented in stylized form as Z's. A second subset of characters including only one character, Z 124, is displayed in subset 121. Characters in subsets 120 and 121 are twice as large a point size as characters already entered and displayed 101–106.

According to one embodiment of the invention, subset 120 is displayed with a different background from subset 121 in order to help the user distinguish between subset 120 and subset 121. According to one embodiment of the invention, borders are not displayed separating subset 120 and subset 121. Rather, according to one embodiment of the invention, these subsets are distinguished from each other by differences in background between each other. For example, subset 121 may appear with a gray background while subset 120 may have a white background. These backgrounds may be interchanged as one subset or the other is provisionally selected. An advantage not displaying borders is that space is conserved on the monitor, as in a television monitor where resolution may be relatively low. Not displaying borders helps to allow more space for showing characters in a large format. Further, horizontal display of the characters, as shown here according to one embodiment of the invention, has an advantage of providing greater resolution in a television screen.

In an alternative embodiment, the user does not have to request the front end processor, but rather the set of corresponding characters is automatically displayed at some time after the user has entered a set of inputs that corresponds to one or more characters. The characters 122, 123, and 124 as shown here may comprise all characters corresponding to user inputs 107–109, or may include only subsets of those characters corresponding to such inputs, according to the likelihood that such characters are those intended by the user. Such characters may also be displayed depending on frequency of use based on past user inputs or based on location in the sentence or context.

The user may regroup the inputs upon which the display of characters is based. Then, different characters may be displayed instead of character 122, 123 and 121, as characters that correspond to user inputs 107–111. For example, initially, the system may group 107 and 108 together, displaying them as 122, and group 109, I110, and 111, displaying them as 123. Later if the user selects a regrouping, the regrouping may place 107–110 together and 111 alone.

The user may select characters from those characters displayed in FIG. 1B.

For example, the user may select character 124, and then that character will be displayed in a point size generally the same as the point size of characters 101–106. Alternatively, the user may request additional choices of characters corresponding to user inputs 107–111. The result of such a selection is shown in FIG. 1C.

Figure 1C:
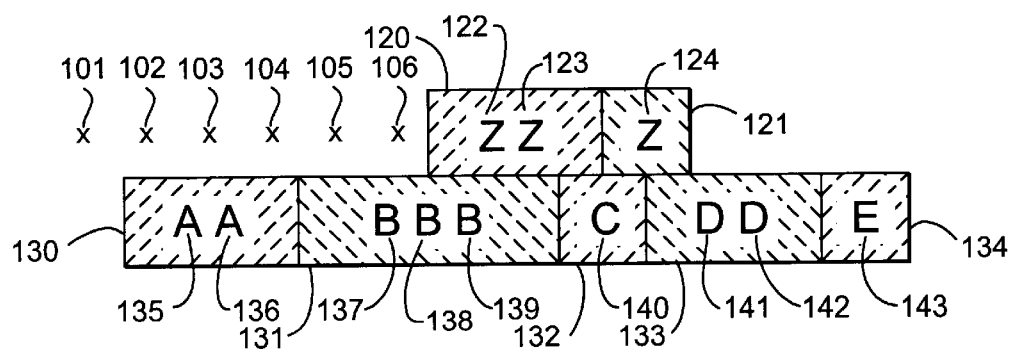
FIG. 1C shows a line of characters in a text processing system including characters displayed for a selection along with additional subsets characters displayed for selection.

FIG. 1C shows a line of characters in a text processing system including characters displayed for a selection along with additional subsets characters displayed for selection. If the user requests, the system displays additional subsets of characters corresponding to the set of user inputs 107–111. Here, additional set 130, 131, 132, 133, and 134 are shown. The additional subsets of characters are shown below subsets 120 and 124. The additional subsets are displayed in enlarged size, a point size twice as large as the point size of the previously entered and displayed characters. Any of these subsets of characters may be the desired match for the user input 107–111. For example, characters 135 and 136 (represented by A's) in set 130 may correspond to user inputs 107–111. Alternatively, a match may apply for set 131, which includes a character 137, 138, and 139 (represented by B's), or subset 132, which includes character 140 (represented by a C), subset 133, which includes character 141 and 142 (represented by D's), or subset 134, which includes character 143 (represented by an E). The user may select any of these displayed subsets of characters. Then, the selected characters are displayed in a point size generally the same as the point size of characters already selected and displayed. For example if X 101 is displayed in 24 point, according to an embodiment of the invention, Z 122–124 are displayed in 48 point, and Z 160 and 161 are displayed in 24 point. According to one embodiment of the invention, the respective subsets are displayed without borders between them. Separation between the respective subsets may be designated by differences in shading in the backgrounds of the respective subsets. For example, subset 130 may be shown with a first background, and subset 131 may be shown with a second background. Subset 132 may be shown with the same background as subset 130, and subset 133 may be displayed with the same background as subset 131, and subset 134 may be shown with the same background as subset 130.

Figure 1D:
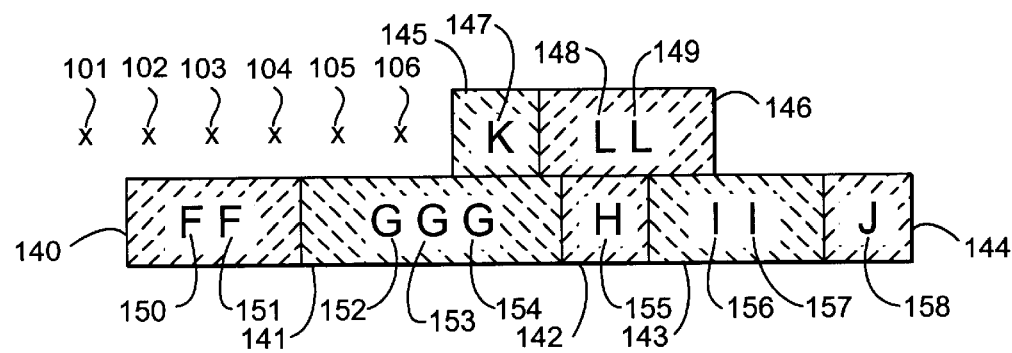
FIG. 1D shows a line of characters in a text processing system including characters displayed for selection after a regrouping of user inputs.

FIG. 1D shows a line of characters in a text processing system including characters displayed for selection after a regrouping of user inputs. As noted, user inputs 107–111 may be regrouped to cause display of different characters corresponding to the user inputs. According to an embodiment of the invention the regrouping occurs only when the first line of choices are present, such as in FIG. 1B. The regrouping of user inputs 107–111, according to one embodiment of the invention is not seen directly by the user; rather the user merely sees the result of the regrouping. In the example of FIG. 1D, the system may display subset 145 and 146 as a result of regrouping of inputs 107–111. Subset 145 includes character 147 (represented by a K). Subset 146 includes characters 148 and 149 (represented by L's). Next, the user may request additional subsets of characters corresponding to the regrouped inputs. Accordingly, subsets 140, 141, 142, 143, and 144 are then displayed beneath subsets 145 and 146. As shown, subset 140 includes characters 141 and 151 (represented by F's), subset 141 includes characters 152, 153 and 154 (represented by G's), subset 145 includes character 155 (represented by an H), subset 143 includes characters 156 and 157 (represented by I's), and subset 144 includes character 158 (represented by a J). As shown, the various subsets include characters that are enlarged relative to previously accepted and displayed characters 101–106.

Figure 1E:
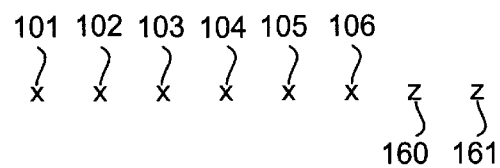
FIG. 1E shows a line of characters including newly selected characters.

FIG. 1E shows a line of characters including newly selected characters. As shown, previously entered characters 101–106 are displayed, in addition to newly selected characters 160 and 161. In this example, characters 160 and 161 are from subset 120 as was shown, for example, in FIG. 1B. These newly selected characters 160 and 161 are displayed in a size generally that of characters 101–106.

As shown in the above examples with FIGS. 1A–1E, phonetic information may be entered, and then characters corresponding to the phonetic information are displayed in a size larger than that of previously entered and displayed characters. This phonetic information may be Japanese hiragana phonetic characters. Similarly, the characters may be Japanese kanji, and may also include additional hiragana. Alternatively, the respective characters and inputs may be from another language, such as Chinese. Characters 107–111, for example, may be any characters representing phonetic spelling or any shorthand corresponding to characters.

Note that in selecting between subsets of characters, the arrow keys of a typical word processing or e-mail system may be used. Alternatively, various buttons in another system may be used for a selection in character entry. For example, a computer game system, arrow keys or other keys may be used for character selection and entry.

Figure 2:
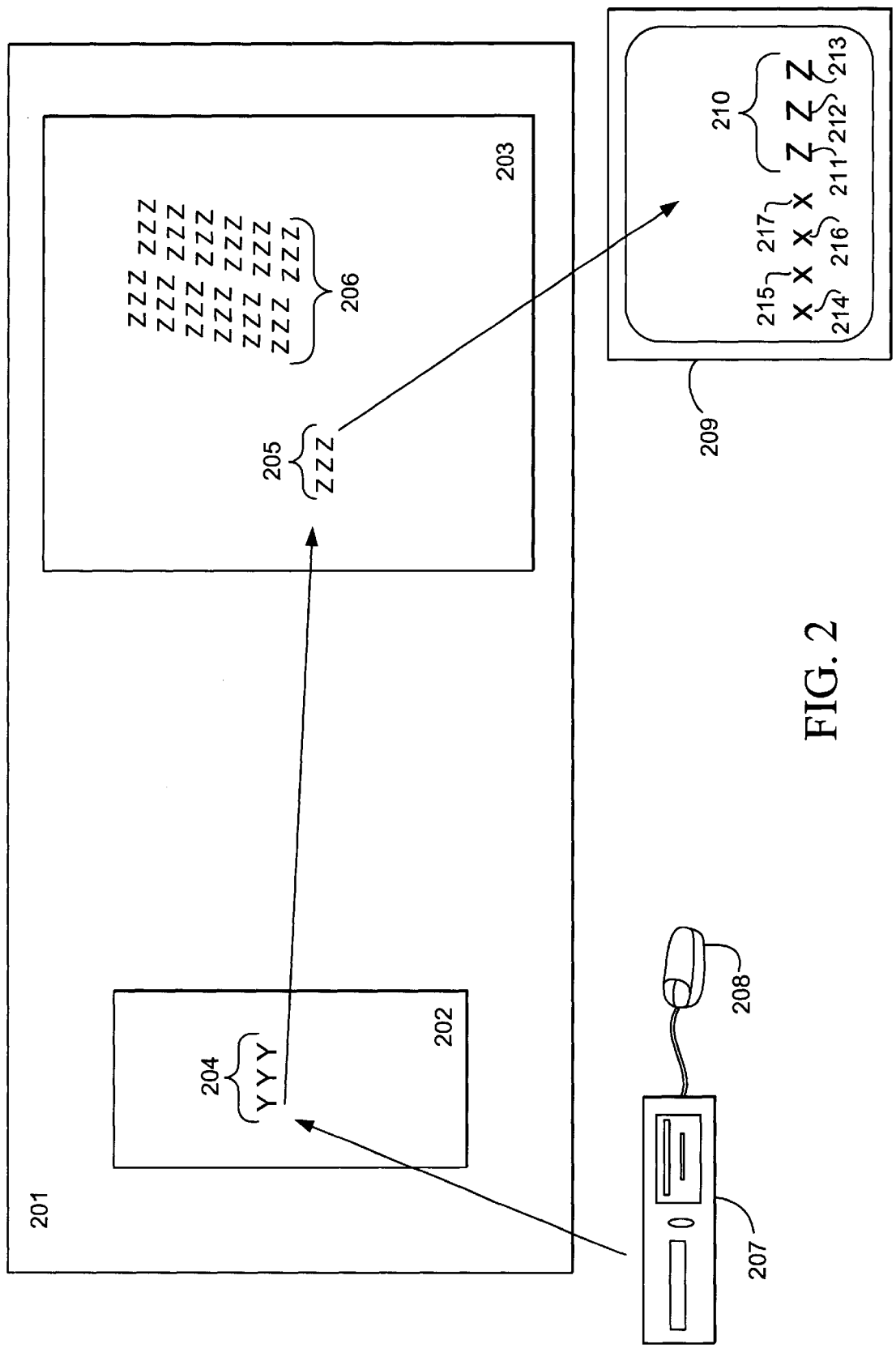
FIG. 2 shows a system for selection and input of characters including a keyboard, a monitor, and a table for associating user inputs with characters.

FIG. 2 shows a system for selection and input of characters including a keyboard, a monitor, and a table for associating user inputs with characters. According to FIG. 2, input from keyboard 207 is used to determine an entry in table 201. Based on the entry in table 201, characters 210 are displayed for selection on display 209. Optional mouse 208 or other pointing device such as a stylus may be used to assist in the selection of the character. According to another embodiment of the invention, keyboard 207 is specifically adapted to the Chinese language. In one embodiment, keyboard 207 is specifically adapted to Mandarin, and in another embodiment, keyboard 207 is specifically adapted to Cantonese. Keyboard 207, according to one embodiment of the invention, is specifically adapted to the Japanese language. Based on inputs from keyboard 207, an entry is determined in table 201. As shown, set of inputs 204 has been entered. List 202 represents various possible combinations of user inputs that correspond to various characters in list of characters 203. For example, here set of user inputs 204 corresponds to set of characters 205. Thus, according to one embodiment of the invention, set of user inputs 204 represents a combination of phonetics, and set of characters 205 is those characters that sound like the phonetic combination represented by set of inputs 204. Set of characters 205 may include multiple subsets of characters that each could correspond to user inputs 204. For example, character 211 may correspond to one possible meaning of inputs 204, and characters 212 and 213 may correspond to a different possible meaning of inputs 204. Set of characters 206 are other characters that do not necessarily correspond to the phonetic combination of user inputs 204. The system displays already entered characters 214–217 on display 209. In response to user input of inputs 204, the system displays set 210, which includes characters 211–213, as selected from table 201. Although this figure represents a table associating phonetics with characters, other systems or processors may be used to associate user input with corresponding characters.

Figure 2B:
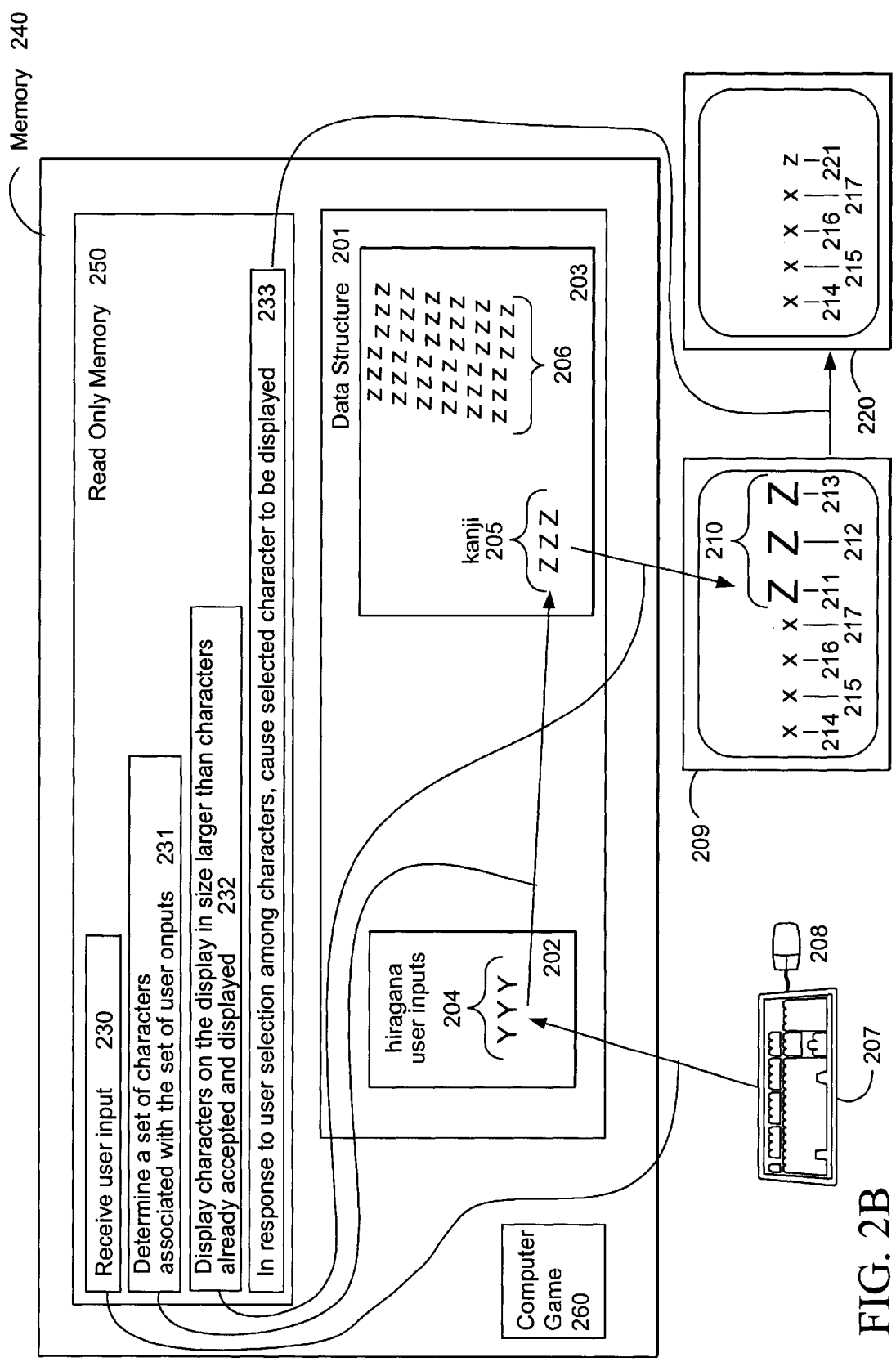
FIG. 2B shows a system for selection and input of characters including a keyboard, monitor, memory and table for associating user input with characters.

FIG. 2B shows a system for selection and input of characters including a keyboard, monitor, memory and table for associating user input with characters. Read only memory 250, data structure 201 and computer game 260 are included in memory 240. Read only memory 250 includes receive user inputs 230, determine a set of characters associated with the set of user inputs 231, display characters on the display in a size larger than characters already accepted and displayed 232 and in response to user selection among characters, cause selected character to be displayed 233.

Figure 3B:
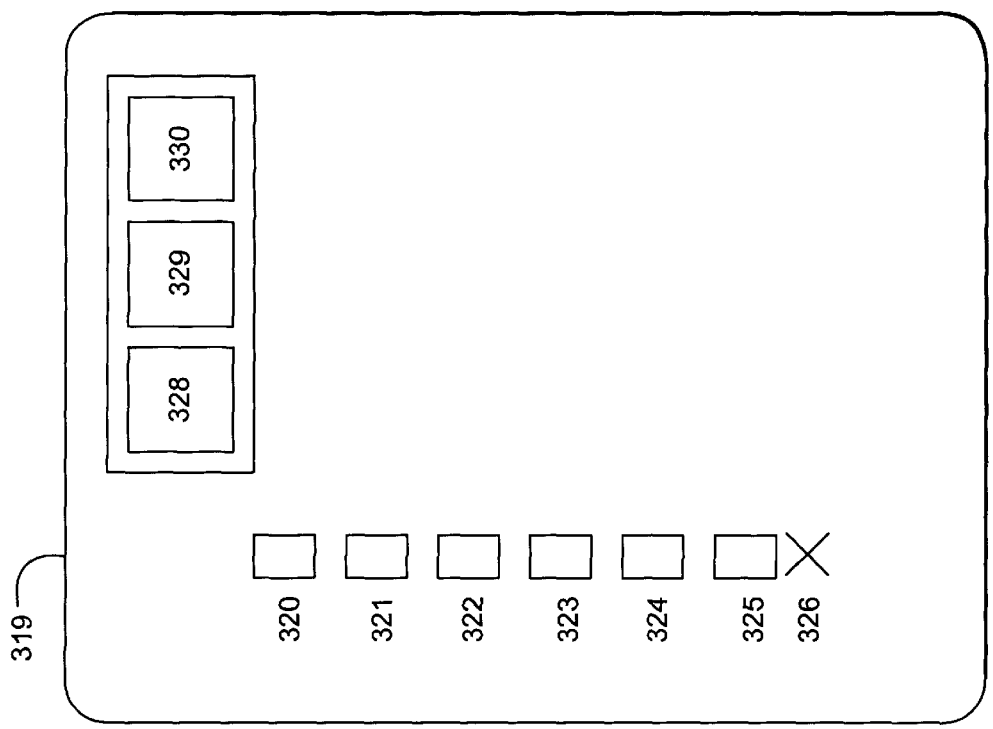
FIG. 3B shows a line of characters along with a set of characters displayed for selection.
Figure 3A:
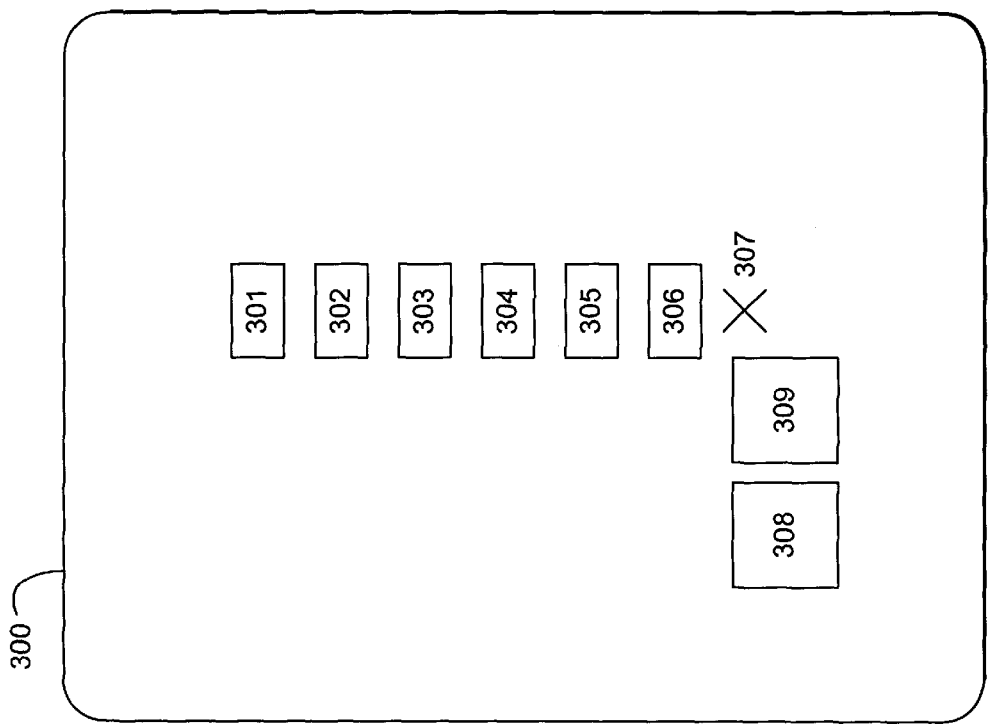
FIG. 3A shows a line of characters along with a set of characters displayed for selection.

FIG. 3A shows a line of characters along with a set of characters displayed for selection. Characters 301–306, which are represented by boxes, have already been entered by a user. The X 307 represents the portion of display 300 at which the new character is to be entered. The phonetics corresponding to the new character may be displayed at X 307 as they are entered by the user, according to one embodiment of the invention. Then, according to an embodiment of the invention, after the user has requested, characters 308 and 309, represented here by boxes, are displayed in large size. According to one aspect of the invention, these characters are displayed in a point size that is twice as tall as the point size of the other characters 301–306 already entered. According to one embodiment of the invention, characters 308 and 309 are displayed twice as tall as any one of characters 301–306. Characters 308 and 309 may be displayed, according to one embodiment of the invention, one and a half times as tall as any one of characters 301–306. Here, characters 301–306 are shown vertically, and the characters 308 and 309 selected among are shown horizontally. According to another aspect of the invention, characters such as characters 308 and 309 are displayed vertically rather than horizontally. As shown, characters 308 and 309 are displayed in close proximity to location X 307. An advantage of such layout is that it helps to preserve the context of choices between which the user is to select.

FIG. 3B shows a line of characters along with a set of characters displayed for selection. FIG. 3B shows previously entered characters 320–325, represented by boxes, and a set of enlarged characters 328–330 for selection in a window 327 on display 319. As shown, previously entered characters 320–325 are displayed vertically. In an alternative embodiment of the invention, such characters are displayed horizontally. The X 326 represents the location on display 319 at which a new character is to be entered. A set of characters 328–330 is displayed, according to this embodiment of the invention, in a different portion of the display 319 than location X 326.

Figure 4A:
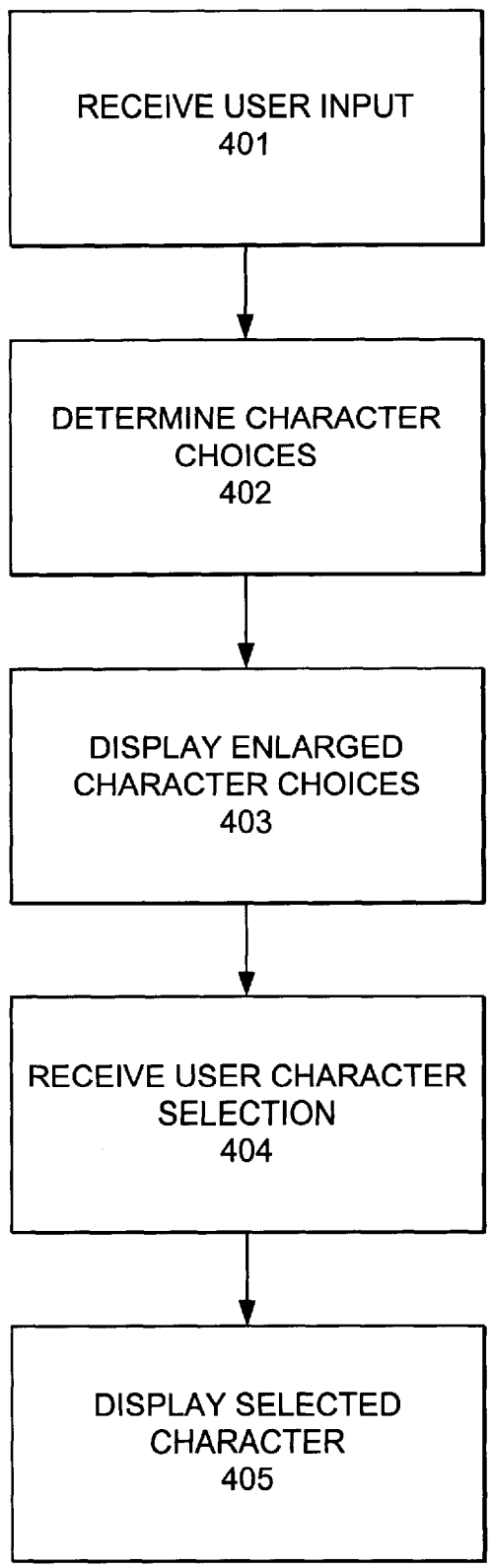
FIG. 4A is a flow diagram showing a method of character selection and input.

FIG. 4A is a flow diagram showing a method of character selection and input. First, receive a user input (block 401). User input, according to one aspect of the invention, includes a set of phonetic symbols corresponding to a set of characters. Next, determine character choices (block 402). Such character choices are characters in the set of characters corresponding to the user input. Next, display character choices as enlarged characters (block 403). Such characters are displayed larger than characters previously entered and currently displayed on the system.

Receive a user character selection (block 404). The user, based on the user's intent to enter a particular character, selects one or more of the characters from the set of characters displayed. Such selection may be accomplished by various means, as it may be typically used in current systems or as may be developed. Next, display the selected character, or characters, according to another embodiment of the invention (block 405). The selected character, according to one embodiment of the invention, is now displayed in the same font size as the previously selected characters. This process may be repeated as the user continues to enter more characters.

Figure 4B:
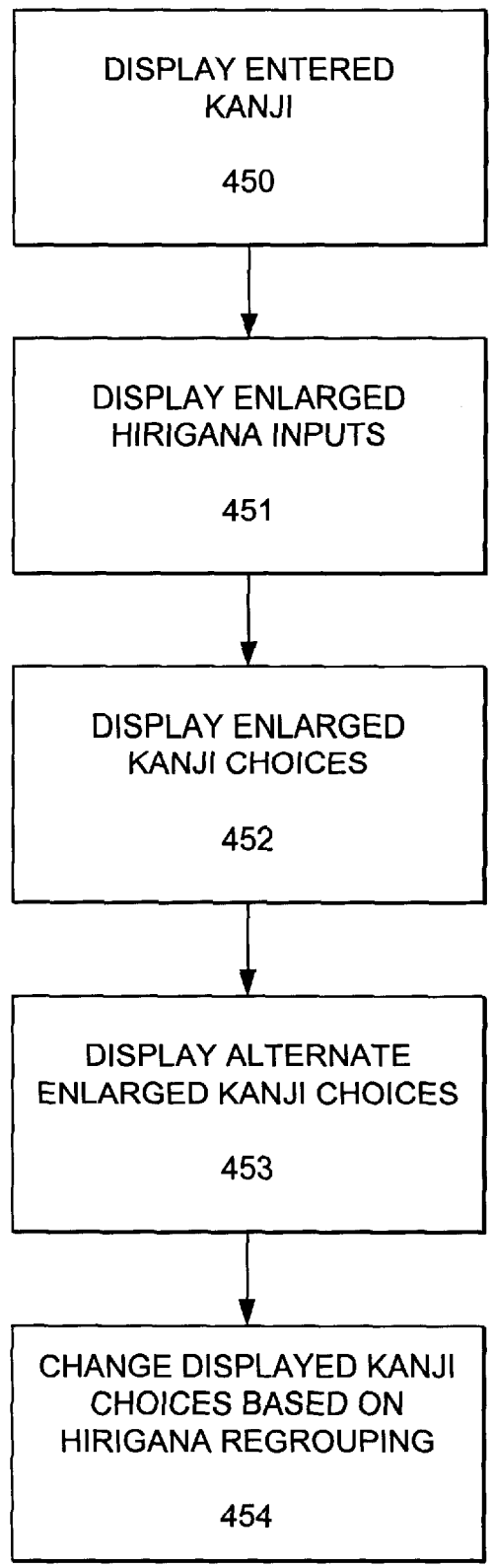
FIG. 4B is a flow diagram showing a method of character selection and input in Japanese.

FIG. 4B is a flow diagram showing a method of character selection and input in Japanese. As noted previously, other embodiments of the system are designed for other languages. Further, embodiments of the system for Japanese language may take forms other than the precise one described with reference to this flow diagram. First, display entered kanji (block 450). These entered kanji represent the selections that the user has made previously and may include other characters in addition to the kanji. Next, display entered hiragana inputs (block 451). Hiragana inputs are displayed as a result of the user inputting the hiragana. Alternative phonetic inputs may also be accepted at this stage. Next, the user would typically select a front end processor to cause the system to display possible kanji choices for the hiragana inputs. The system then displays the enlarged kanji choices (block 452). At this point, the user may select one of the kanji choices or a subset of the kanji choices and cause that choice to be then displayed in normal point size. Alternatively, the user may request additional kanji choices. Then, the system displays the alternate enlarged kanji choices (block 453). Such alternate enlarged kanji choices may be displayed below the initial kanji choices. Other arrangements of the initial choices and alternate choices are possible. For example, the initial choices may disappear and be replace by the alternate kanji choices. The user may then select one of the alternate enlarged kanji choices. The user may also change the display to kanji choices based on hiragana regrouping (block 454). This regrouping may take place when only the initial kanji choices are shown, according to one embodiment of the invention. Alternatively, according to another embodiment of the invention, the regrouping may be done at another stage in the process. Based on the regrouping, different choices are displayed as possible meanings of the hiragana.

Figure 5A:
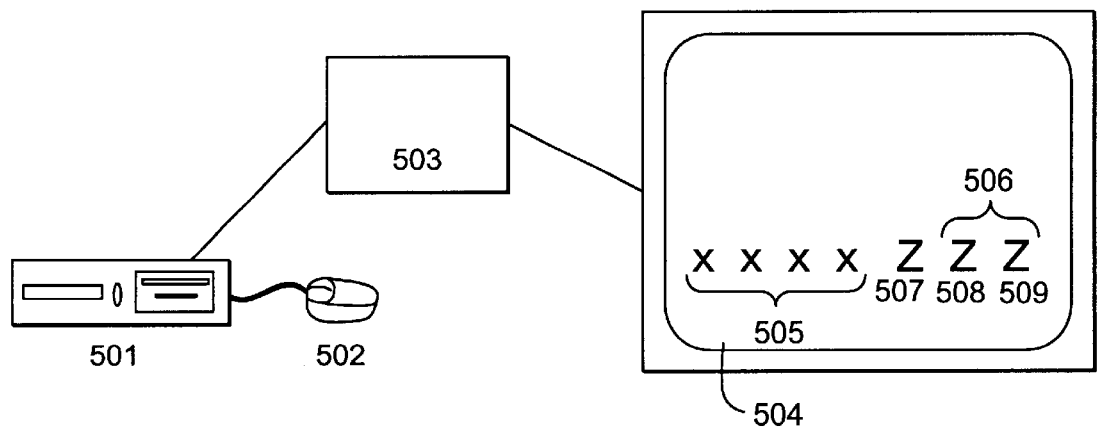
FIG. 5A shows a computer system with a system for character selection.
Figure 5B:
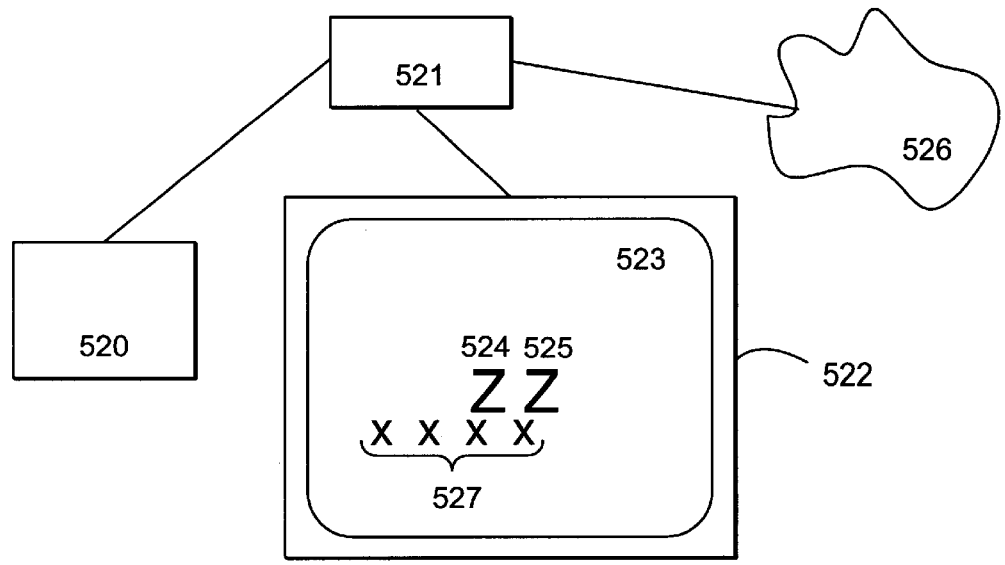
FIG. 5B shows a television system with a system for character selection and input.
Figure 5C:
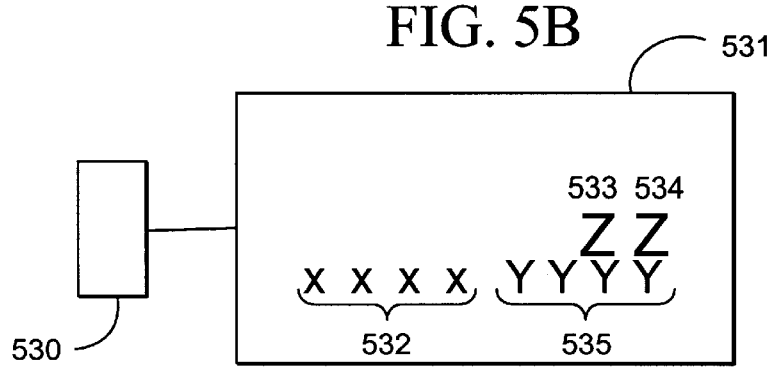
FIG. 5C shows a consumer device with a system for character selection and input.

FIG. 5A–FIG. 5C show various example systems according to different embodiments of the invention. In such example systems, character selection and display may be carried out in various layouts as shown and described above. For example, the display may include display and selection of characters as described according to FIG. 1 of this application. Alternatively, display may be carried out in layouts shown below or in other layouts.

FIG. 5A shows a computer system with a system for character selection. The system in FIG. 5A includes optional mouse 502, keyboard 501, computer 503, and display 504. The system may be a text processing system such as for document processing, or the text processing system may be another system such as an e-mail program or web browser or other system. The user inputs a set of inputs on keyboard 501, which is received by computer 503. Computer 503 displays a set of enlarged characters 507–509, associated with the inputs the user has entered. In this example, subset 506 of characters 508 and 509 may correspond to one possible meaning of user inputs, and character 507 may correspond to another possible meaning of the user inputs. The user may then select between subset 506 and character 507. As shown, previously entered characters 505 are displayed. A set of character choices 507–509 is displayed near to the previously entered characters 505 and in particular near to the location at which the next characters are to be entered. According to some embodiments of the invention, the particular set of characters, e.g., 507–509, is not necessarily displayed at any particular location in relation to the location where the new character is to be entered. These various layouts may be present in embodiments of the invention in various types of systems, including, but not limited to, computers, computer systems, network systems, television systems, and consumer devices.

FIG. 5B shows a television system with a system for character selection and input. The system of FIG. 5B includes user input device 520, set top box 521, television 522, and network 526. User input device 520 is coupled either physically, or electronically, with set top box 521. For example, user input device 520 may be a remote control unit with only wireless connection to set top box 521. Set top box 521 is coupled to television 522 and to network 526. Set top box 521 receives commands from user input device 520. Set top box 521 helps to control what is displayed on display 523, which is part of television 522. Set top box 521 communicates with network 526 to display information from network 526 onto display 523 and to transmit information from the user to network 526. As shown, previously entered characters 527 are displayed on screen 523. Additionally, a set of enlarged characters 524 and 525 are displayed on screen 523 near to a location at which a new character is to be entered. Characters 524 and 525 are displayed in response to user input from user input device 520. The user then selects between characters 524 and 525, and then the selected character is displayed in a font corresponding to the font of previously entered characters 527.

FIG. 5C shows a consumer device with a system for character selection and input. The system of FIG. 5C includes a display 531 coupled to an input device 530. Such input device 530 and display 531 may be part of a consumer device, such as a telephone, hand-held computer, or other device. As shown, previously entered characters 532 are displayed on display 531, and a set of characters 533 and 534 are displayed for user selection also on display 531. Inputs 535 represent user inputs to which the set of characters 533 and 534 correspond.

Figure 6B:
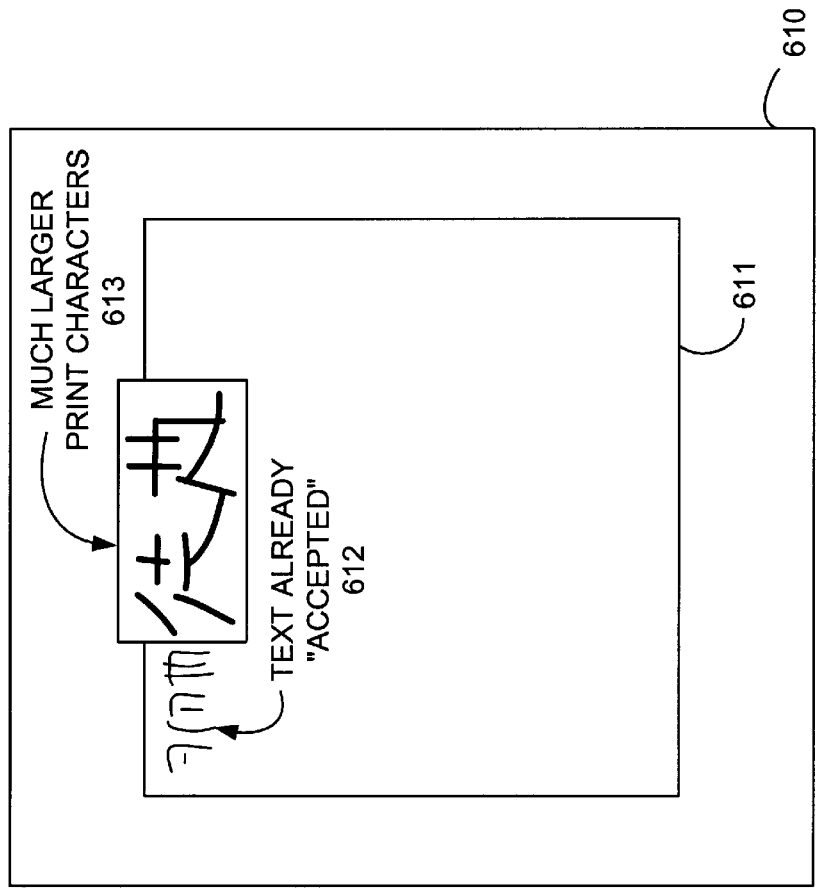
FIG. 6B shows a monitor with a line of text input by a user and a set of characters for selection by the user.
Figure 6A:
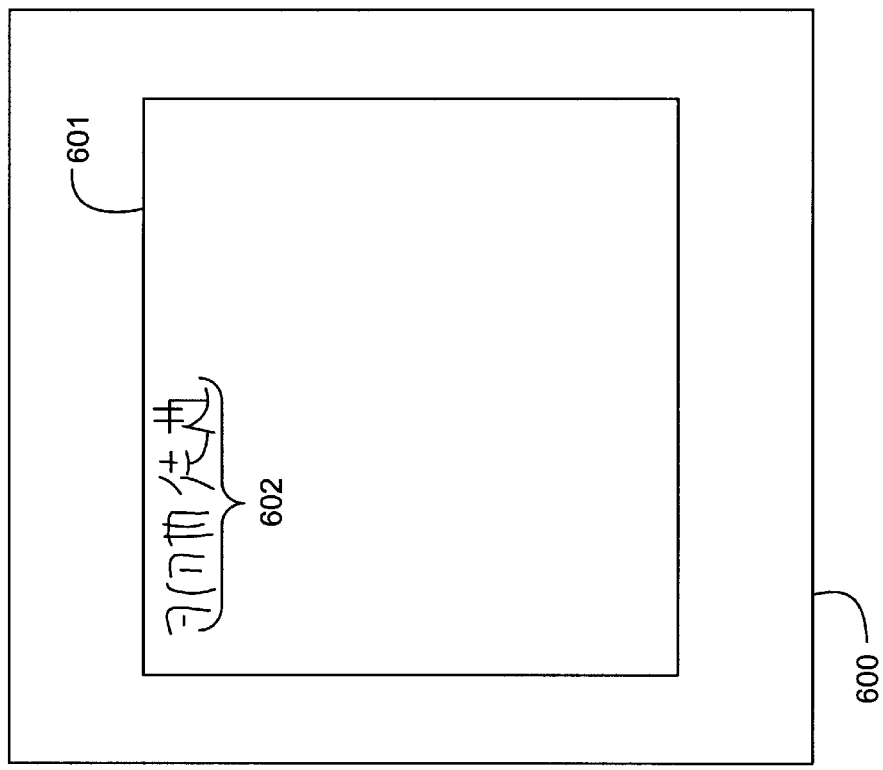
FIG. 6A shows a monitor including a line of text input by a user.

FIG. 6A shows a monitor including a line of text input by a user. Here, the system displays a window 601 on display 600, as in a text processing system for an Asian language such as an e-mail system. Window 601 includes previously entered characters 602. A user provides user inputs to the system, then in response, the system alters, as shown in FIG. 6B.

FIG. 6B shows a monitor with a line of text input by user and a set of characters for selection by the user. In FIG. 6B, display 610 includes window 611, on which text already accepted 612 is displayed along with much larger print characters 613. Text already accepted in 612 is the text corresponding to text 602 shown in FIG. 6A. The user selects among the characters displayed as much larger print characters 613. Then, the selected character or characters are displayed in a font corresponding to text already accepted 612.

Various embodiments of the invention have been illustrated in the figures and have been described in the corresponding text of this application. This foregoing description is not intended to limit the invention to the precise forms disclosed. Rather, the invention is to be construed to the full extent allowed by the following claims and their equivalents.

What is claimed is:

1. A method for accepting user input in a system, the method including:
   receiving a set of user inputs associated with a set of characters;
   in a size larger than characters already accepted and displayed by the system, displaying characters from the set of characters;
   receiving a user selection of at least a character from the set of characters; and
   in response to the user selection, displaying the character in a size generally corresponding to characters already accepted and displayed by the system.

2. The method of claim 1, wherein the size larger than characters already accepted and displayed comprises a size generally twice as tall as characters already accepted and displayed by the system.

3. The method of claim 1, wherein the size larger than characters already accepted and displayed comprises a size at least one and a half as tall as characters already accepted and displayed by the system.

4. The method of claim 1, wherein the size larger than characters already accepted and displayed comprises a size at least twice as tall as characters already accepted and displayed by the system.

5. The method of claim 1, wherein the size larger than characters already accepted and displayed comprises a point value generally twice as great as the point value of characters already accepted and displayed by the system.

6. The method of claim 1, wherein the size larger than characters already accepted and displayed comprises a size large enough to allow the user to distinguish between the characters in the set of characters.

7. The method of claim 1, including highlighting a character among the set of characters at which the user is pointing with a pointing device.

8. The method of claim 1, wherein the set of characters comprises kanji.

9. The method of claim 1, wherein the set of inputs comprises a set of hiragana and the set of characters comprises kanji associated with the set of hiragana.

10. The method of claim 1, wherein displaying the set of characters includes displaying the characters on a cathode ray tube (CRT) monitor.

11. The method of claim 1, wherein displaying the set of characters includes displaying the characters on a liquid crystal display (LCD).

12. The method of claim 1, including:
   displaying more than one character from the set of characters in response to the user selection.

13. The method of claim 1, wherein the set of characters includes:
   a first subset of the set of characters corresponding to the set of user inputs; and
   a second subset of the set of characters corresponding to the set of user inputs.

14. The method of claim 13, including displaying the first subset and the second subset, wherein the first subset has a different background than the second subset.

15. The method of claim 13, including displaying the first subset and the second subset without borders between them.

16. The method of claim 13, including displaying the first subset and the second subset without borders between them and displaying the first subset in an area having a different background than the second subset.

17. The method of claim 1, wherein the set of characters includes:
   a first subset of characters corresponding to the set of user inputs;
   a second subset of characters corresponding to the set of user inputs; and
   additional subsets of characters corresponding to the set of user inputs;
   wherein the method comprises:
      displaying the first and second subsets of characters without displaying the additional subsets of characters, and
      if the user requests display of additional characters corresponding to the set of user inputs, displaying subsets of characters from the additional subsets of characters.

18. The method of claim 17, including displaying the subsets of characters without borders between them.

19. A computer system, comprising:
a display;
a user input device;
a memory including a data structure, the data structure associating sets of user inputs with respective sets of characters; and
computer executable code including
code that receives a set of user inputs, the set of user inputs received from the user input device,
code that based on the data structure, determines a set of characters associated with the set of user inputs,
code that causes at least some characters from the set of characters to be displayed on the display, the at least some characters being displayed in a size larger than characters already accepted and displayed on the display, thereby providing ease of selection among the at least some characters displayed, and
code that in response to a user selection among the at least some characters, causes at least a selected character to be displayed, in a size that generally corresponds to the size of characters already accepted and displayed by the system, on the display.

20. The system of claim 19, wherein the size larger than characters already accepted and displayed comprises a size generally twice as tall as characters already accepted and displayed by the system.

21. The system of claim 19, wherein the size larger than characters already accepted and displayed comprises a size at least one and a half as tall as characters already accepted and displayed by the system.

22. The system of claim 19, wherein the size larger than characters already accepted and displayed comprises a size at least twice as large as characters already accepted and displayed by the system.

23. The system of claim 19, wherein the set of characters comprises kanji.

24. The system of claim 19, wherein the set of inputs comprises a set hiragana and the set of characters comprises kanji associated with the set of hiragana.

25. The system of claim 19, the computer executable code including:
code that causes a subset of characters from the set of characters to be displayed in response to the user selection.

26. The system of claim 19, wherein the set of characters includes:
a first subset of the set of characters corresponding to the set of user inputs; and
a second subset of the set of characters corresponding to the set of user inputs.

27. The system of claim 26, wherein the computer executable code includes code that causes the first subset to be displayed in an area having a different background than the second subset.

28. The system of claim 26, wherein the computer executable code includes code that causes the first subset and the second subset to be displayed without borders between them.

29. The system of claim 26, wherein the computer executable code includes code that causes the first subset and the second subset to be displayed without borders between them and causes the first subset to be displayed in an area having a different background than the second subset.

30. The system of claim 19, wherein the set of characters includes:
a first subset of characters corresponding to the set of user inputs;
a second subset of characters corresponding to the set of user inputs; and
additional subsets of characters corresponding to the set of user inputs;
wherein the computer executable code comprises:
code that causes the first and second subsets of characters to be displayed without displaying the additional subsets of characters, and
code that, if the user requests display of additional characters corresponding to the set of user inputs, causes subsets of characters to be displayed from the additional subsets of characters.

31. The system of claim 30, the computer executable code including code that causes the subsets of characters to be displayed without borders between them.

32. A system, comprising:
a television monitor;
a computer system coupled to a network and to the television monitor,
a user input device; and
logic that includes
logic that receives a set of user inputs, the set of user inputs received from the user input device,
logic that determines a set of characters associated with the set of user inputs,
logic that causes at least some characters from the set of characters to be displayed on the television monitor, the at least some characters being displayed in a size larger than characters already accepted and displayed on the television monitor, thereby providing ease of selection among the at least some characters displayed, and
logic that in response to a user selection among the characters from the set displayed, causes a selected character to be displayed, in a size that generally corresponds to the size of characters already accepted and displayed by the television monitor, on the television monitor.

33. The system of claim 32, wherein the size larger than characters already accepted and displayed comprises a size generally twice as tall as characters already accepted and displayed by the system.

34. The system of claim 32, wherein the size larger than characters already accepted and displayed comprises a size at least one and a half as tall as characters already accepted and displayed by the system.

35. The system of claim 32, wherein the size larger than characters already accepted and displayed comprises a size at least twice as tall as characters already accepted and displayed by the system.

36. The system of claim 32, wherein the set of characters comprises kanji.

37. The system of claim 32, wherein the set of inputs comprises a set of hiragana and the set of characters comprises kanji associated with the set of hiragana.

38. The system of claim 32, wherein the logic comprises circuitry.

39. The system of claim 32, wherein the logic comprises software.

40. The system of claim 32, wherein the logic comprises software embedded in read only memory.

41. The system of claim 32, wherein the television monitor is coupled to a cable television system.

42. The system of claim 32, wherein the television monitor is coupled to a receiver for receiving broadcast television signals.

43. The system of claim 32, wherein the network comprises the Internet.

44. The system of claim 32, including logic to perform a computer game.

45. The system of claim 32, the logic including:
   logic that causes more than one character from the set of characters to be displayed in response to the user selection.

46. The system of claim 32, wherein the set of characters includes:
   a first subset of the set of characters corresponding to the set of user inputs; and
   a second subset of the set of characters corresponding to the set of user inputs.

47. The system of claim 46, wherein the logic includes logic that causes the first subset to be displayed in an area having a different background than the second subset.

48. The system of claim 46, wherein the logic includes logic that causes the first subset and the second subset without borders between them.

49. The system of claim 46, wherein the logic includes logic that causes the first subset and the second subset to be displayed without borders between them and causes the first subset to be displayed in an area having a different background than the second subset.

50. The system of claim 32, wherein the set of characters includes:
   a first subset of characters corresponding to the set of user inputs;
   a second subset of characters corresponding to the set of user inputs; and
   additional subsets of characters corresponding to the set of user inputs;
   wherein the logic comprises:
      logic that causes the first and second subsets of characters to be displayed without displaying the additional subsets of characters, and
      logic that, if the user requests display of additional characters corresponding to the set of user inputs, causes subsets of characters from the additional subsets of characters to be displayed.

51. The system of claim 50, the logic including logic that causes the subsets of characters to be displayed without borders between them.

\* \* \* \* \*